(12) United States Patent
Alonso Tesson

(10) Patent No.: US 11,951,891 B1
(45) Date of Patent: Apr. 9, 2024

(54) EXTRUDED STRIP FOR AUTOMOTIVE FLOOR MAT

(71) Applicant: Alfonso Miguel Alonso Tesson, Parkland (FI)

(72) Inventor: Alfonso Miguel Alonso Tesson, Parkland (FI)

( * ) Notice: Subject to any disclaimer, the term of this patent is extended or adjusted under 35 U.S.C. 154(b) by 0 days.

(21) Appl. No.: 18/373,613

(22) Filed: Sep. 27, 2023

Related U.S. Application Data

(60) Provisional application No. 63/411,980, filed on Sep. 30, 2022.

(51) Int. Cl.
*B60N 3/04* (2006.01)

(52) U.S. Cl.
CPC .................................. *B60N 3/048* (2013.01)

(58) Field of Classification Search
CPC ...................................................... B60N 3/048
USPC ................................ 296/97.23, 75; 428/36.8
See application file for complete search history.

(56) References Cited

U.S. PATENT DOCUMENTS

| | | | |
|---|---|---|---|
| 3,238,554 A * | 3/1966 | Mann, Jr. ............. | A47L 23/266 160/371 |
| 3,312,497 A * | 4/1967 | Stata ..................... | B60N 3/044 296/97.23 |
| 3,450,429 A * | 6/1969 | Stata ..................... | B60N 3/044 296/97.23 |
| 5,683,780 A * | 11/1997 | Rodger .............. | A47G 27/0475 428/95 |
| 6,027,781 A * | 2/2000 | Landry ................. | B60N 3/044 428/40.1 |
| 9,333,890 B2 * | 5/2016 | Garbarino ............. | B60N 3/044 |
| 2002/0086129 A1 * | 7/2002 | Kessler .................. | A47L 23/26 428/44 |
| 2016/0176329 A1 * | 6/2016 | Aronow ................ | B60N 3/048 29/428 |

FOREIGN PATENT DOCUMENTS

DE 3712882 A1 * 11/1988

* cited by examiner

*Primary Examiner* — Pinel E Romain
(74) *Attorney, Agent, or Firm* — Mariana I. Vernieri

(57) ABSTRACT

The present invention relates to an extruded rubber or plastic strip for adding it to the edges of textile and rubber vehicle mats with the purpose of keeping dust and grime inside of the mat, diminishing contamination of the vehicle's floor, and preventing the mat from slipping and obstructing pedal use, without need of replacing the whole mat. This strip is flexible enough to adapt to the shape of many rubber and textile vehicle mats. It has a slit in which the edge of the mat can be inserted to mount the accessory to the mat and an internal cavity, adjacent to the slit and higher than the slit, for imprisoning the edge of the mat and ensuring a firm grip. The exterior side is higher than the interior side, so that, once applied, the accessory stops the water, dust, or grime from exiting the mat.

1 Claim, 3 Drawing Sheets

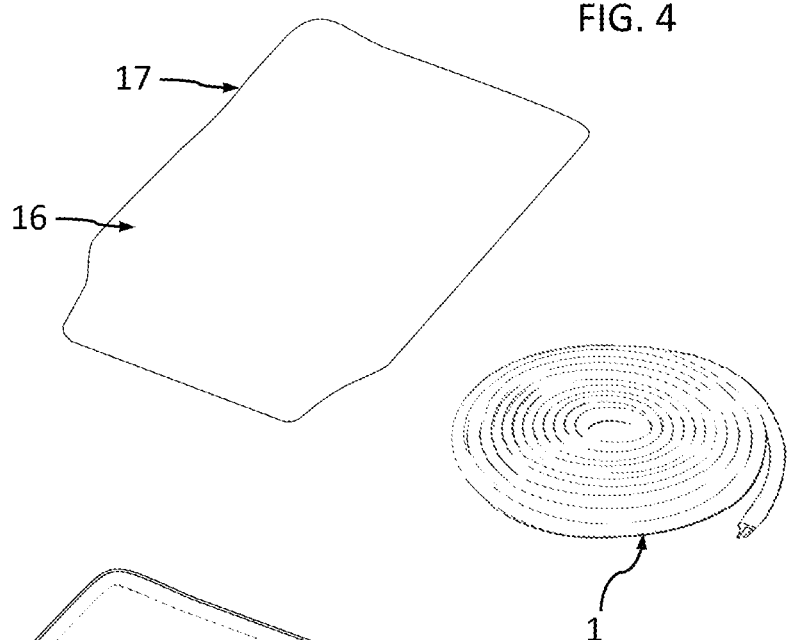
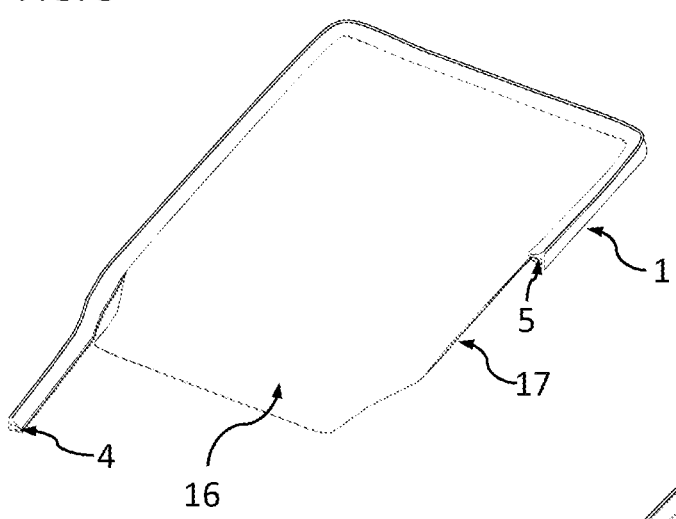
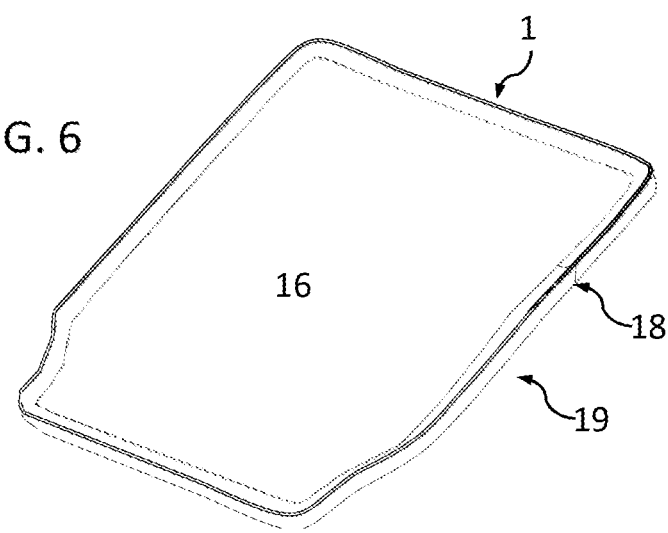

EXTRUDED STRIP FOR AUTOMOTIVE FLOOR MAT

CROSS-REFERENCE TO RELATED APPLICATION

This application claims the benefit of U.S. Provisional Patent Application No. 63/411,980, filed Sep. 30, 2022, which is incorporated by reference herein in its entirety.

TECHNICAL FIELD

This invention relates generally to the field of vehicle accessories. More particularly, this invention relates to an extruded strip made from rubber or plastic to contain dust and grime within an automotive floor mat, preventing contamination of the vehicle's floor.

BACKGROUND OF THE INVENTION

Vehicle floor mats serve a critical function in maintaining the interior cleanliness of a vehicle. These mats come in various types:
1. Fabric Mats: Widely available and cost-effective, these mats feature a range of colors and designs. Although some have rubber backing to minimize slippage, they can still move and potentially obstruct pedals. These mats are typically universal in size, easy to clean, and can be removed for daily maintenance. However, they tend to sag over time and have a shorter lifespan compared to other options.
2. Rubber Mats: Known for their durability, these mats are designed not to slip, thereby ensuring safe pedal operation. They also have textured surfaces to capture moisture. However, they require frequent cleaning and are generally available only in black.
3. All-Weather Mats: Made of thick vinyl material, these mats are more durable than regular rubber mats. They feature upturned edges to contain water, dust, and grime, and possess spikes on the back to prevent slippage.
4. Nomad Mats: These customizable mats efficiently trap water, mud, and grime with minimal spillage. They require less frequent cleaning and are available in several colors. The curls soak up the water, mud and dust and do not let them touch the driver's feet.
5. 3D Mats: The most expensive option, these mats offer a premium fit with excellent containment of dust, water, and grime within their grooves. However, they must be cleaned regularly and occasionally adjusted to avoid pedal obstruction.

As seen here, the most affordable and convenient of the floor mat options available to the public (textile mats and rubber mats) do not have elevated borders which are present in some of the most expensive models to avoid the contamination of the interior of the vehicle through the borders of the mat. The only option available to a customer right now it to upgrade to some of the most expensive options (3D mat or All-weather mats) which are not only notoriously more expensive than the textile and rubber mats, but also possess other disadvantages depending on the model. There is an unresolved need for an accessory that can be applied to any textile, rubber, and nomad mats, to provide upturned edges to those originally flat mats to stop the water, dust, or grime to exit the mat, besides making them anti-slip to prevent the obstruction of pedal use, without need of replacing the whole mat for a more expensive one, To address these shortcomings, and to offer a more practical, effective, and cost-efficient alternative to existing solutions, the present invention introduces an extruded strip made of rubber or plastic. This strip can be attached to the edges of fabric and rubber vehicle mats to contain dust and grime, prevent floor contamination, and enhance mat stability to avoid slippage and pedal obstruction.

SUMMARY OF THE INVENTION

The invention discloses an extruded strip made from rubber or plastic designed for attachment to the edges of textile and rubber vehicle floor mats. The primary objective is to contain dust and grime within the mat, thereby preventing contamination of the vehicle's floor and ensuring the mat remains securely in place to avoid obstructing pedal usage.

Key Objectives

1. The primary goal of this invention is to offer a flexible strip adaptable to the edges of existing vehicle floor mats of various shapes and sizes. This strip provides upturned edges that effectively contain water, dust, and grime within the mat, eliminating the need to replace the entire mat with a more expensive model.
2. A secondary objective is to equip the mat with anti-slip properties. The strip features a surface that prevents slippage, ensuring the mat remains in its intended position without interfering with pedal operation.

Key Features

An extruded rubber or plastic strip for automotive floor mat in accordance with the present invention is achieved by combining some or all of the following aspects:
1. A flexible main body composed of plastic, rubber, or similar material, designed to adapt to the contours of a variety of rubber and textile vehicle mats.
2. A slit in the strip to allow the mat's edge to be inserted easily, facilitating straightforward attachment.
3. An internal cavity adjacent to and higher than the slit, designed to securely grip the edge of the mat.
4. A raised external sidewall relative to the internal sidewall, ensuring that, once applied, the accessory effectively contains water, dust, and grime within the mat.

BRIEF DESCRIPTION OF THE DRAWINGS

FIG. 4 is a perspective view of an embodiment of an extruded rubber or plastic strip for automotive floor mat in accordance with the present invention in its a rolled-up state, prior to being applied to the automotive floor mat.

FIG. 5 is a perspective view of an embodiment of an extruded rubber or plastic strip for automotive floor mat in accordance with the present invention, as it is being applied to an automotive floor mat.

FIG. 6 is a perspective view of an embodiment of an extruded rubber or plastic strip for automotive floor mat in accordance with the present invention, fully applied to an automotive floor mat.

DETAILED DESCRIPTION AND BEST MODE OF IMPLEMENTATION

Figure 1:
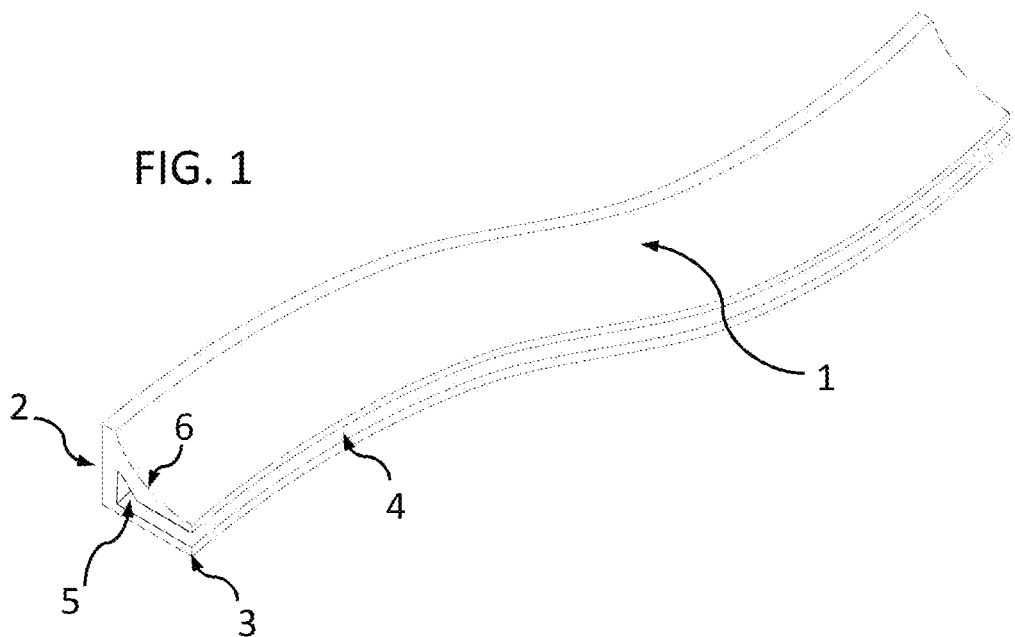
FIG. 1 is a perspective view of an embodiment of an extruded rubber or plastic strip for automotive floor mat in accordance with the present invention, demonstrating its flexibility.

Disclosed is an extruded rubber or plastic strip for automotive floor mats. More precisely, the aforementioned automotive extruded rubber or plastic strip was projected and developed with the purpose of mitigating the effects of water, dust, or grime exiting the mat and contaminating the interior of the vehicle, by providing upturned edges to an otherwise flat-edged mat and to help keep the vehicle mats in place to prevent from slipping and obstructing the pedal use. For better achieving the anti-slip goal, the strip may include, in some cases, a non-skid design in the lower side of the strip, that is the part of the strip which will be in touch with the floor of the car. This can be done, for example, by introducing protuberances in the surface of the lower face of the strip.

Materials

High-flexibility polymers with high resistance and low porosity are the preferred materials for the strips. Options include but are not limited to thermoplastic elastomers (TPV), EPDM rubber, and polychloroprene rubber compounds. Alternative embodiments could use SBR, NBR, Neoprene, Viton, and Silicone. The key criteria are flexibility, elasticity, and the ability to be cut easily with standard scissors. Other plastics or rubbers can be used as long as they meet the necessary flexibility and elasticity characteristics to be able to adapt to the corners and different shapes of the edge of different models of mats, and to grip to them firmly and staying in place.

Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures, and functional details disclosed herein are not to be interpreted as limiting. Instead, the intended function of this disclosure is to exemplify some of the ways —including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Referring to the drawings in more detail, FIG. 1 depicts an embodiment of an extruded rubber or plastic strip, showing its flexibility through the curved shape it acquires with movement. The strip is flexible enough to be rolled into itself and to be bended ninety degrees or more without deformation, adapting to the mat's corners. The flexible elongated body 1 has an upwardly-extending exterior sidewall 2 higher than the interior sidewall 3. Beginning at the interior sidewall 3, it features a slit 4 in which the edge of the mat can be inserted to mount the strip 1 to the mat. This slit 4 is connected to an internal cavity 5, higher than the slit 4, for imprisoning the edge of the mat and ensuring a firm grip. The exterior sidewall 2 and the interior sidewall 3 are connected by a sloped connecting wall 6 which can be either straight or curved.

Figure 2:
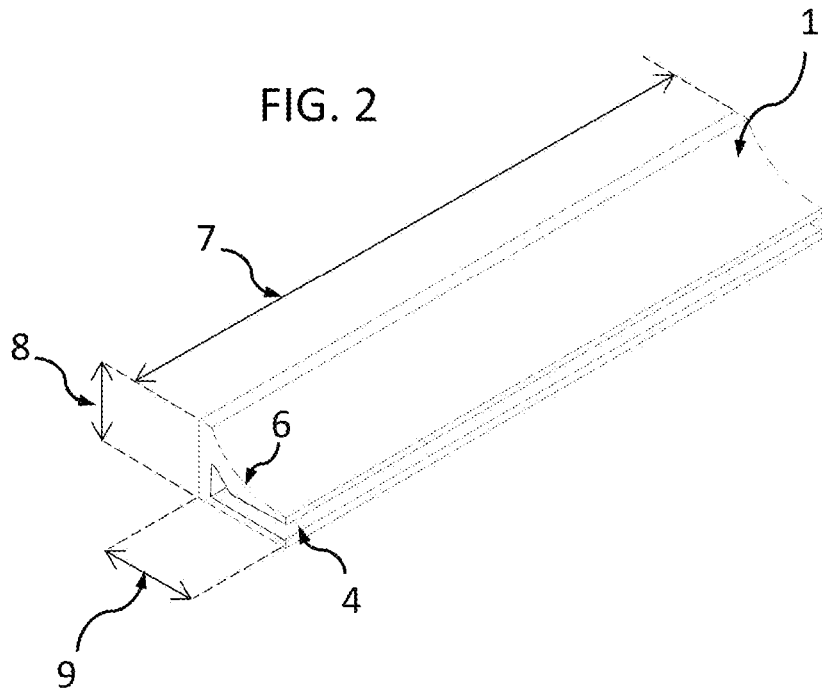
FIG. 2 is a perspective view of an embodiment of an extruded rubber or plastic strip for automotive floor mat in accordance with the present invention, showing the dimensions of the strip.

FIG. 2 shows a straight piece of strip, where the length 7, width 9 and outer height 8 of the flexible elongated body 1 can be appreciated. The outer height 8 is the height of the exterior sidewall 2. As depicted in the drawings, the fixed width 9 is generally commensurate to the external heigh 8. Although this does not mean that these two measures are exactly the same, and the relative measurements can present some variations depending on design choices, the width 9 and external heigh 8 of the strip are designed to be of a generally similar scale, contributing to the overall balance and proportions of the design.

Figure 3:
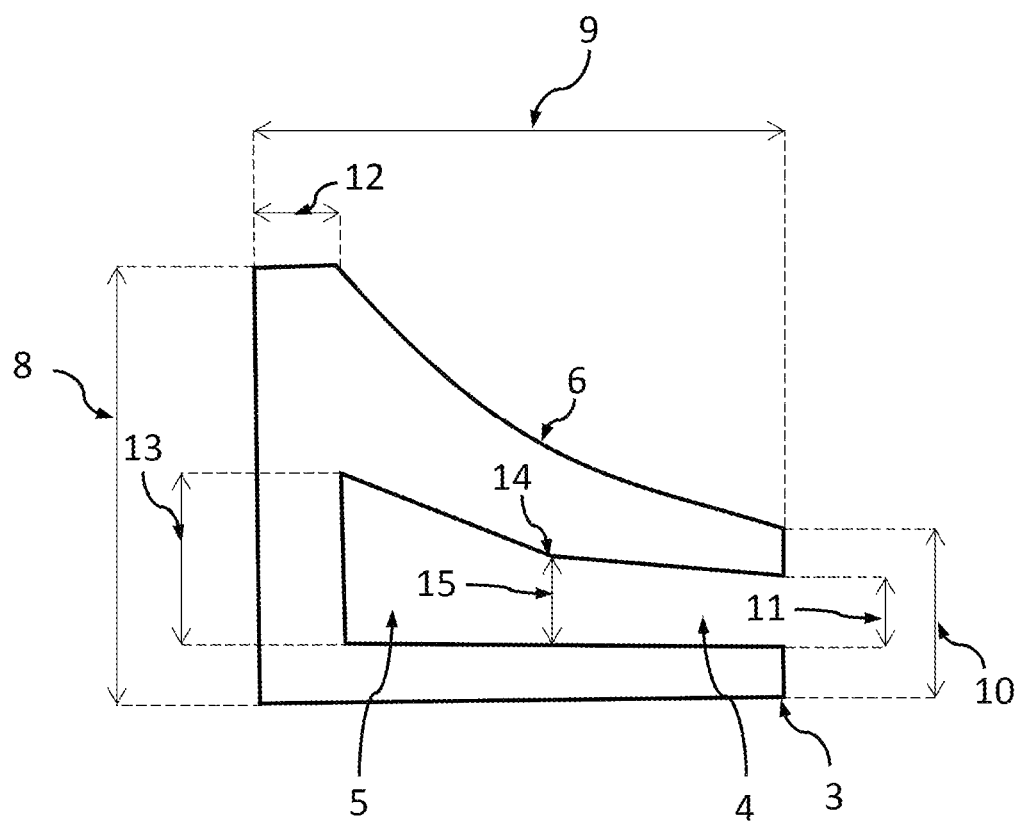
FIG. 3 is a front view of an embodiment of an extruded rubber or plastic strip for automotive floor mat in accordance with the present invention, highlighting the details of the strip's profile.

FIG. 3 offers a more detailed front view of the profile of an embodiment of an extruded rubber or plastic strip's flexible elongated body 1. In it, the inner height 10 of the interior sidewall 3 which should measure between 5 and 23 mm, is at least 30% shorter than the outer height 8, which should measure between 17 and 33 mm. The slit height 11 should measure between 4 and 10 mm but height could broaden as the slit approaches the midpoint 14, acquiring a midpoint height 15. Lastly, the maximum cavity height 13 of the internal cavity 5, should measure between 4 and 17 mm, while the midpoint height 15 at the midpoint 14, measures somewhere in between of the maximum cavity height 13 and the slit height 11.

FIG. 4 shows a rolled up extruded rubber or plastic strip's flexible elongated body 1, before being applied to the edge 17 automotive floor mat 16. This rolled up form is a preferred presentation for the product.

In FIG. 5 the plastic strip's flexible elongated body 1 is being applied to the automotive floor mat 16. As shown, the edge 17 of the mat 16 is introduced inside of the slit 4 of the flexible elongated body 1, until reaching the cavity 5. This way, the flexible elongated body 1 is inserted all around the mat 16, cutting the strip at the desired point and pressing it so that it completely encloses the mat 16, as shown in FIG. 6, so that, once applied on the vehicle floor 19 the accessory will stop the water, dust, or grime to exit the mat 16.

Implementation

1. Cut the strip according to the mat's perimeter.
2. Insert the mat edge into the strip's slit and guide it into the internal cavity.
3. Press firmly to ensure the strip completely encloses the mat.
4. Cut off excess strip material, if necessary The description as set forth is not intended to be exhaustive or to limit the invention to the precise form disclosed. Many modifications and variations are possible in light of the teachings above without departing from the spirit and scope of the forthcoming claims.

The invention claimed is:

1. An extruded strip for an automotive floor mat, said floor mat having a perimeter edge, said strip comprising:
    a) a flexible elongated body fabricated from a material group consisting of rubber, thermoplastic elastomers (TPV), EPDM rubber, and polychloroprene rubber compounds;

b) an upwardly-extending exterior sidewall juxtaposed to a shorter interior sidewall, both connected by a sloped connecting wall;
c) a slit beginning at said shorter interior sidewall for insertion of an edge of the automotive floor mat;
d) an internal cavity adjacent to said slit, said internal cavity being higher than said slit, said internal cavity structured to imprison and secure said edge of the automotive floor mat;

wherein the strip is mountable to automotive floor mat edges, covering the entire perimeter edge of the floor mat, to confine at least one of water, dust, or grime, and to stabilize mat position on a vehicle floor;

wherein:

e) said interior sidewall has an inner height ranging from 5 to 23 mm and said upwardly-extending exterior sidewall has an outer height ranging from 17 to 33 mm, with the inner height being at least 30% shorter than the outer height;
f) said slit has a slit height at the interior sidewall ranging from 4 to 10 mm; and
g) said internal cavity has a maximum cavity height ranging from 4 to 17 mm and a a midpoint height, with the midpoint height being intermediate between the maximum cavity height and the slit height at the interior sidewall.

\* \* \* \* \*